United States Patent
Nagahara

[11] Patent Number: 5,959,857
[45] Date of Patent: Sep. 28, 1999

[54] POWER SUPPLY APPARATUS FOR PRODUCING A CONSTANT DC VOLTAGE FROM A RANGE OF AC INPUTS

[75] Inventor: Kiyokazu Nagahara, Tokyo, Japan

[73] Assignee: Sony Corporation, Tokyo, Japan

[21] Appl. No.: 08/956,442

[22] Filed: Oct. 23, 1997

[30] Foreign Application Priority Data

Oct. 28, 1996 [JP] Japan ................................. 8-285414

[51] Int. Cl.[6] .......................... H02M 3/335; H02M 3/24; H02M 7/5387; H02M 7/04
[52] U.S. Cl. .............................. 363/132; 363/17; 363/98; 363/143
[58] Field of Search ................................ 363/17, 98, 133, 363/132, 125, 143, 142, 131, 127, 95

[56] References Cited

U.S. PATENT DOCUMENTS

| | | | |
|---|---|---|---|
| 4,504,895 | 3/1985 | Steigerwald | 363/17 |
| 4,628,426 | 12/1986 | Steigerwald | 363/17 |
| 4,665,323 | 5/1987 | Russell et al. | 363/142 |
| 4,700,287 | 10/1987 | Nilssen | 363/132 |
| 4,758,941 | 7/1988 | Felton et al. | 363/132 |
| 4,845,607 | 7/1989 | Nakao et al. | 363/143 |
| 4,937,731 | 6/1990 | Konopka | 363/143 |
| 4,953,068 | 8/1990 | Henze | 363/17 |
| 5,060,130 | 10/1991 | Steigerwald | 363/65 |
| 5,260,864 | 11/1993 | Simonelli et al. | 363/143 |
| 5,347,164 | 9/1994 | Yeh | 307/66 |
| 5,406,192 | 4/1995 | Vinciarelli | 363/143 |
| 5,546,294 | 8/1996 | Schutten et al. | 363/17 |
| 5,572,415 | 11/1996 | Mohan | 363/143 |
| 5,764,500 | 6/1998 | Matos | 363/132 |

Primary Examiner—Robert E. Nappi
Assistant Examiner—Bao Q. Vu
Attorney, Agent, or Firm—Jay H. Maioli

[57] ABSTRACT

A power source apparatus where an exciting current of a primary winding of an insulating converter transformer is switched by a switching element and an oscillation state of an oscillating drive circuit connected to the switching element is controlled according to a secondary side output voltage of the insulating converter transformer for controlling the secondary side output voltage to be a constant voltage. Under the control of the oscillating drive circuit, a supplying path of the exciting current is changed over between two modes of a full bridge action and a single ended push-pull or half bridge action.

6 Claims, 8 Drawing Sheets

POWER SUPPLY APPARATUS FOR PRODUCING A CONSTANT DC VOLTAGE FROM A RANGE OF AC INPUTS

BACKGROUND OF THE INVENTION

The present invention relates to a power supply apparatus suitable for being used, for example, in electronic appliances which have an extensive range of an input commercial AC voltage.

Power source voltages used all over the world are roughly divided into a 100 V area and a 200 V area. Therefore, for an electronic appliance shipped without any specified destination, there is such a need that the appliance operates normally irrespective of which one of the power source voltages is applied thereto. However, if the power source apparatus is so structured, for example, by one AC-DC converter, such a fear arises that losses will increase in parts of a switching element, a transformer, and the like depending on a system of the applied power source.

Figure 1:
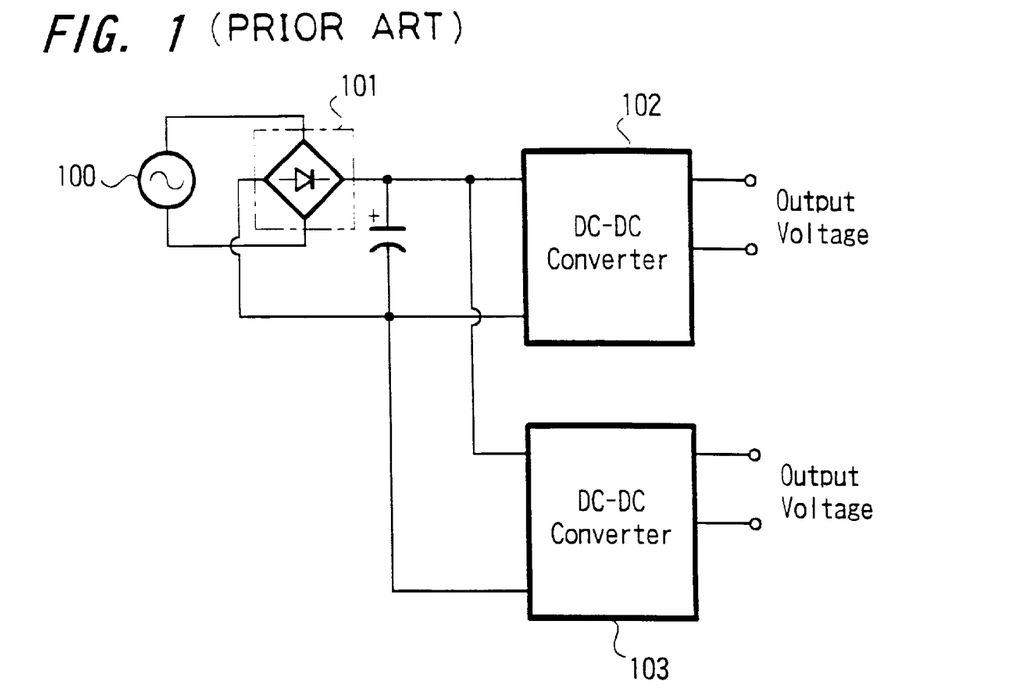
FIG. 1 is a diagram showing an arrangement of a power source apparatus.
Figure 2:
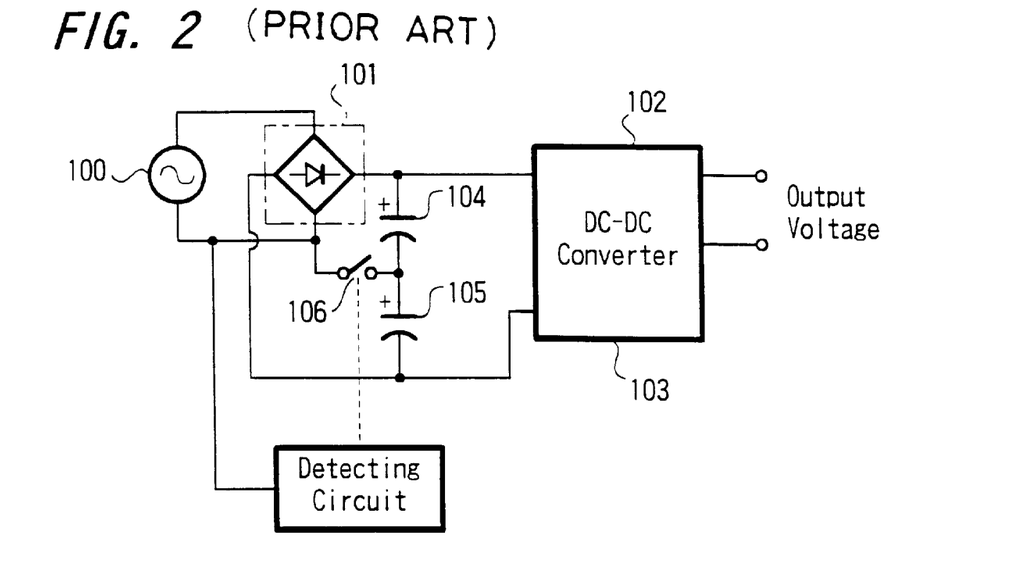
FIG. 2 is a diagram showing an arrangement of another power source apparatus.

Therefore, in a power source apparatus which has been in use with such an electronic appliance, an arrangement shown, for example, in FIGS. 1 and 2 has been used in the art. That is, in an arrangement of FIG. 1, an AC input voltage from a commercial power source 100 and the like is rectified in full wave by a diode bridge circuit 101. After the rectified output is smoothed, a DC output voltage is obtained by using a plurality of DC-DC converters 102, 103. According to this arrangement, the total losses can be reduced by dividing a load into the plurality of DC-DC converters.

Also, in the arrangement shown in FIG. 2, the smoothing action is conducted by a series circuit of a couple of capacitors 104, 105 and at the same time, a connecting middle point of the capacitors 104, 105 is connected to one AC input terminal of the diode bridge circuit 101 through a switch 106. Then, the switch 106 is controlled depending on a voltage at the AC input terminal, so that rectification is changed over from a primary side to a double voltage rectification in a 100 V system and to the full wave rectification in a 200 V system, which makes voltages supplied to the DC-DC converter equal so that an efficient control can be conducted by the single DC-DC converter 102.

With the system where a plurality of converters are provided as shown in FIG. 1, however, there is an increase in the number of parts compared with a system which is made up of one converter, and hence an increase in manufacturing costs. Also, with the rectification change-over system shown in FIG. 2, in case where, for example, a double voltage rectification is conducted in the 200 voltage system due to an abnormality, there is a possibility that a rectified output nearly approaches 800 V at the largest necessitating such counter-measures as to provide a specific safety device and the like for avoiding a damage to a circuit element and an accident.

That is, in an area where a state of the power source is unstable, for example, almost±30% in fluctuations of a nominal power source voltage can ordinarily happen. In that case, there is a fear, for example, that a power source in the 200 V system is detected in error as that in the 100 V system, and in a changed over state to the double voltage rectification, if a voltage in the 200 V side rises rapidly, the rectified output possibly approaches 800 V at the largest.

Alternatively, although it is carried out that the control range is expanded by one converter, this inevitably requires switching elements and a transformer large in size, and brings about large-sizing of the whole appliances and worsening of transformation efficiency of the power source apparatus itself.

SUMMARY OF THE INVENTION

In view of such aspects, it is an object of the present invention to provide a power source apparatus which can solve the problem that in a power source apparatus of an electronic appliance which is shipped without any specified destination, there have occurred problems of such as large-sized appliance, worsening of transformation efficiency and a fear of an output voltage of extremely high voltage being taken out due to an abnormality.

According to an aspect of the present invention, a power source apparatus is one in which an exciting current of a primary winding of an insulating converter transformer is switched by a switching element and an oscillation state of an oscillating drive circuit connected to the switching element is controlled according to a secondary side output voltage of the insulating converter transformer for controlling the secondary side output voltage to be a constant voltage. Under the control of the oscillating drive circuit, a supplying path of the exciting current is changed over between two modes of a full bridge action and a single ended push-pull and half bridge action.

DESCRIPTION OF THE PREFERRED EMBODIMENTS

A power source apparatus according to the present invention is a power source apparatus in which an exciting current of a primary winding of an insulating converter transformer is switched by a switching element and an oscillating state of an oscillation drive circuit connected to the switching element is controlled depending on a secondary side output voltage of the insulating converter transformer so that the secondary side output voltage is controlled to be a constant voltage, being arranged such that a supplying path of the exciting current is changed over by controls of the oscillating drive circuit between two modes of a full bridge action and a single ended push-pull or half bridge action.

Figure 3:
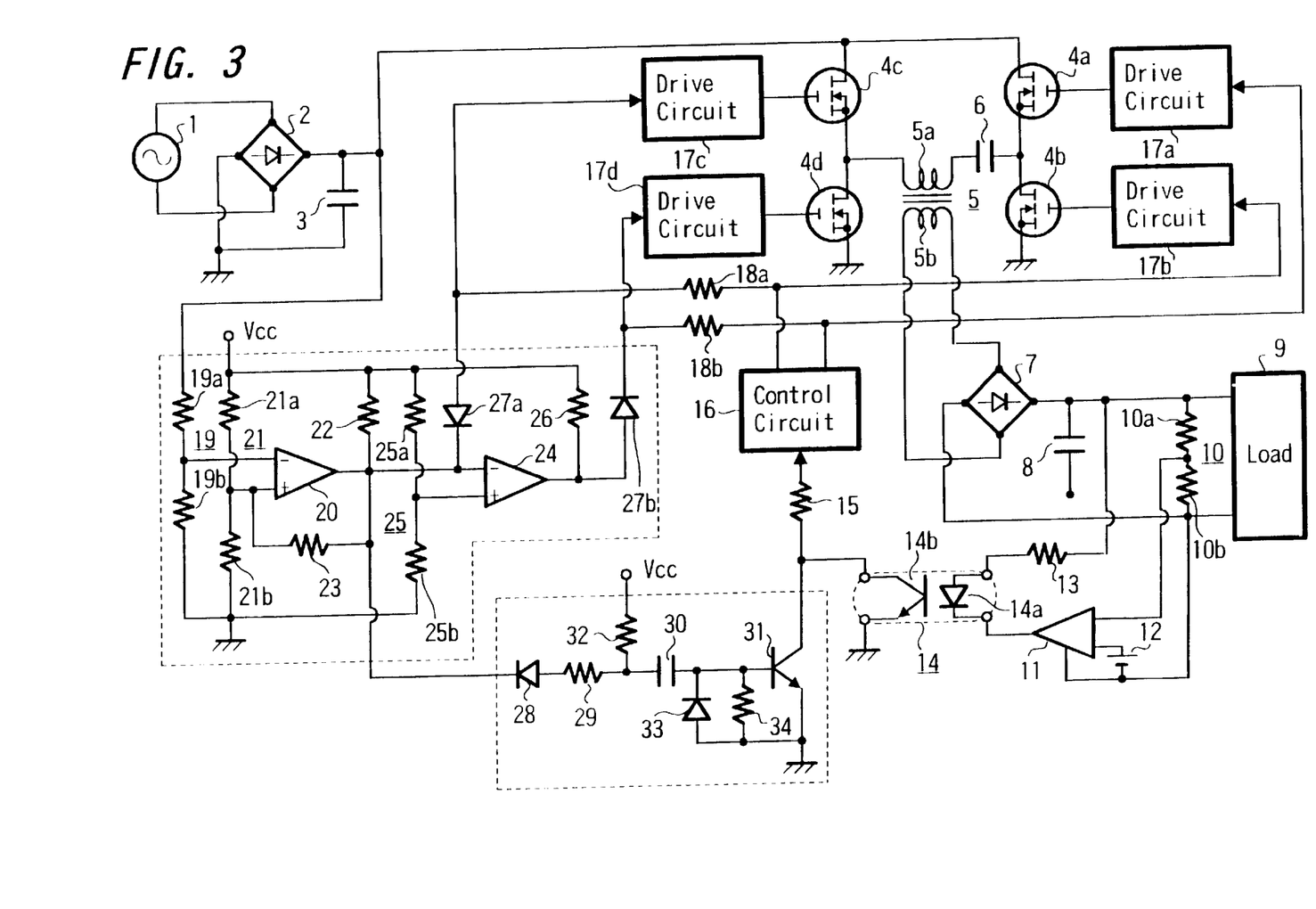
FIG. 3 is a diagram showing an arrangement of a power source apparatus to which the present invention is applied, by way of example.

Hereafter, the present invention will be explained with reference to the drawings. FIG. 3 is a block diagram showing an arrangement of one example of a power source apparatus to which the present invention is applied. In the FIG. 3, an AC input power source 1 is connected to both ends at an AC input side of a diode bridge 2. A smoothing capacitor 3 is provided between a plus side output end and a minus side output end of the diode bridge 2, and at the same time, the minus side output end of the diode bridge 2 is grounded.

Further, the plus side output end of the diode bridge 2 is grounded through two pairs of series circuits of two stone switching elements 4a, 4b and 4c, 4d. Therefore, each of the series circuits of these two pairs of switching elements 4a, 4b and 4c, 4d is connected between the plus side output end and the minus side output end of the diode bridge 2.

Between middle points of the series circuits of these switching elements 4a, 4b and 4c, 4d is provided a series circuit of a primary winding 5a of an insulating converter transformer 5 and a resonance capacitor 6. Both ends of a secondary side winding 5b of the insulating converter transformer 5 are connected to both ends of an AC input side of a diode bridge 7, and between a plus side output end and a minus side output end of the diode bridge 7 is provided a smoothing capacitor 8. The plus side output end and the minus side output end of the diode bridge 7 are connected to a load 9.

Further, a voltage dividing circuit 10 comprising resistors 10a and 10b is provided between the plus side output end and the minus side output end of the diode bridge 7. A voltage dividing point of the voltage dividing circuit 10 is connected to one input of an error amplifier 11 and at the same time a reference voltage source 12 is connected to the other input of the error amplifier 11.

Also, the plus side output end of the diode bridge 7 is connected through a resistor 13 to one end of a light emission diode 14a forming a photo-coupler 14 and the other end of the light emission diode 14a is connected to an output of the error amplifier 11. Further, an emitter of a photo-transistor 14b forming the photo-coupler 14 is grounded and its collector is connected to a control terminal of an oscillating control circuit 16 through a resistor 15.

Then, outputs of the oscillating control circuit 16 are connected to drive circuits 17a, 17b of the switching elements 4a, 4b and also connected through resistors 18a, 18b to drive circuits 17c, 17d of the switching elements 4c, 4d.

As a result, the DC output voltage to be applied to the load 9 is detected at the secondary side of the insulating converter transformer 5 and a detected signal is supplied to the control terminal of the oscillating control circuit 16 through the photo-coupler 14. Then a drive pulse signal formed in accordance with the detected signal by the oscillating control circuit 16 is supplied to the switching elements 4a, 4b, 4c, 4d and switching of each switching element is controlled. Specifically, such a control is carried out that at the voltage dividing point of the voltage dividing circuit 10, an electric potential coincides with the potential of the reference voltage source 12.

Further, the plus side output end of the above mentioned diode bridge 2 is grounded through a voltage dividing circuit 19 comprising resistors 19a, 19b and the voltage dividing point thereof is connected to an inversion input of a comparator 20. Also, a power source terminal of a voltage Vcc is grounded through a voltage dividing circuit 21 comprising resistors 21a, 21b and the voltage dividing point thereof is connected to a non-inversion input of the comparator 20. An output of the comparator 20 is connected to the power source terminal of the voltage Vcc through a resistor 22 as well as to the non-inversion input through a resistor 23.

Figure 4A:
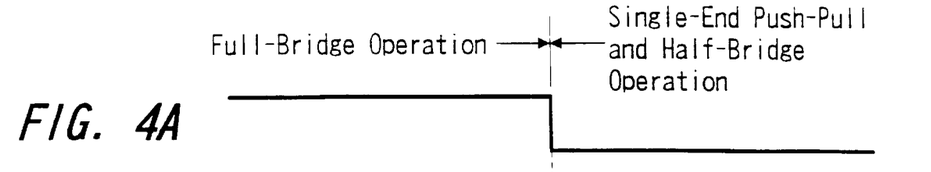
FIGS. 4A to 4J are waveform diagrams used to explain the power source apparatus according to the present invention.

Therefore, as shown in FIG. 4A, for example, a low electric potential is derived from the comparator 20, when a voltage dividing electric potential of the voltage dividing circuit 19, which is decided depending on an electric potential of the plus side output end of the diode bridge 2, is higher than a predetermined electric potential obtained at a voltage dividing point of the voltage dividing circuit 21, and when the voltage dividing electric potential is lower, a high electric potential is derived. Further, since the output of the comparator 20 is positively fed back to the non-inversion input thereof, an inversion action of the high electric potential and the low electric potential of the output is given with a hysteresis.

Figure 4B:
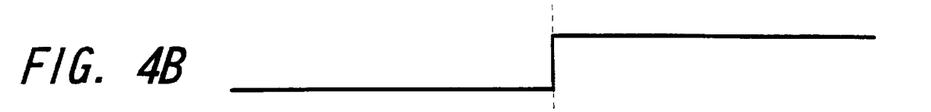
Figure 4C:
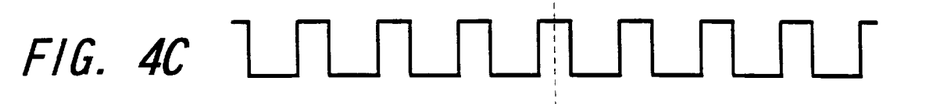
Figure 4D:
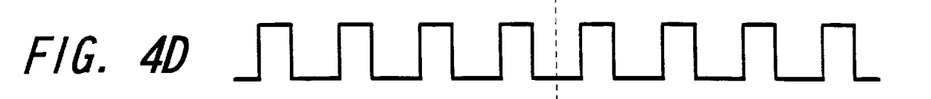
Figure 4E:
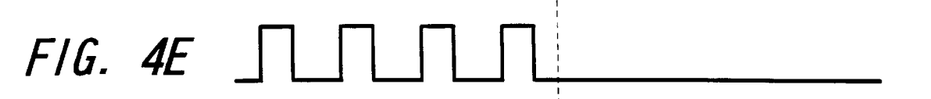
Figure 4F:
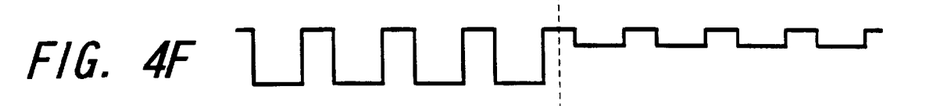

Also, the output of the comparator 20 is connected to an inversion input of a comparator 24 and at the same time, the power source terminal of the voltage Vcc is grounded through a voltage dividing circuit 25 comprising resistors 25a, 25b and the voltage dividing point thereof is connected to a non-inversion input of the comparator 24. Further, the output of the comparator 24 is connected to the power source terminal of the voltage Vcc through a resistor 26. Therefore, the output of the comparator 20 is derived from the comparator 24, as FIG. 4B shows, in an inverted state.

That is, in this apparatus, when the electric potential at the plus side output end of the diode bridge 2 is lower than the above mentioned predetermined value, it becomes as is shown at a left side in FIGS. 4A to 4J. Also, when the electric potential at the plus side output end is higher than the above mentioned predetermined value, it becomes as is shown at a right side in FIGS. 4A to 4J. And the output of the comparator 20 is connected to a connecting middle point between the resistor 18a and the drive circuit 17c through a diode 27a of a backward direction and the output of the comparator 24 is connected to a connecting middle point between the resistance 18b and the drive circuit 17d through a diode 27b of a forward direction.

Therefore, in this apparatus, when the above mentioned electric potential at the plus side output end is lower than the predetermined value, the diodes 27a, 27b are both cut off. As a result, to the drive circuits 17a–17d, for example, as shown respectively at left sides of FIGS. 4C to 4F, drive pulse signals outputted from the oscillating control circuit 16 are supplied as they are. From the drive circuits 17a–17d, the above mentioned drive pulse signals are derived as they are, as shown respectively at left sides of FIGS. 4G to 4J, and supplied to the switching elements 4a–4d.

On the other hand, when the electric potential at the above mentioned plus side output end is higher than the predetermined value, the diodes 27a, 27b are turned on. As a result, an input to the drive circuit 17c is biased to a low electric potential as is shown at a right side of FIG. 4E and an input to the drive circuit 17d is biased to a high electric potential as is shown at a right side of FIG. 4F. Meanwhile, to the inputs of the drive circuits 17a, 17b, as are shown respectively at right sides of FIGS. 4C and 4D the outputs of the oscillating control circuit 16 are supplied as they are.

Figure 4G:
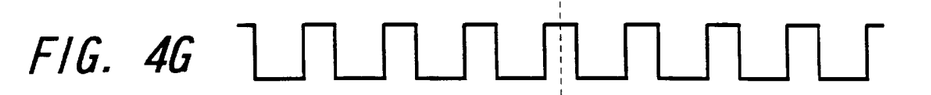
Figure 4H:
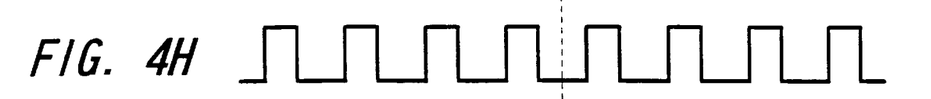
Figure 4I:
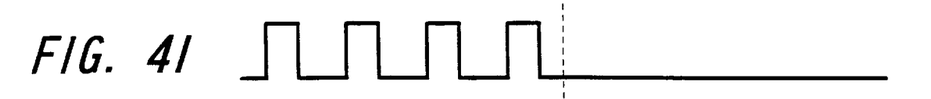
Figure 4J:
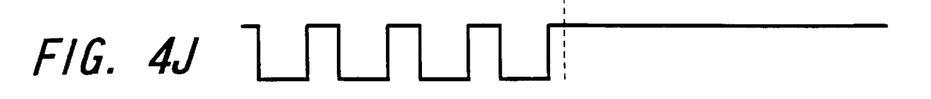

As against these inputs, from the drive circuit 17a, 17b, as FIGS. 4G and 4H, respectively show, the above mentioned drive pulse signals are taken out as they are and supplied to the switching elements 4a, 4b. Meanwhile, from the drive circuit 17c, as is shown at a right side of FIG. 4I, an output which is fixed at a low electric potential is taken out and supplied to the switching element 4c. Also, from the drive circuit 17d, as is shown at a right side of FIG. 4J, an output which is fixed at a high electric potential is taken out and supplied to the switching element 4d.

Figure 5A:
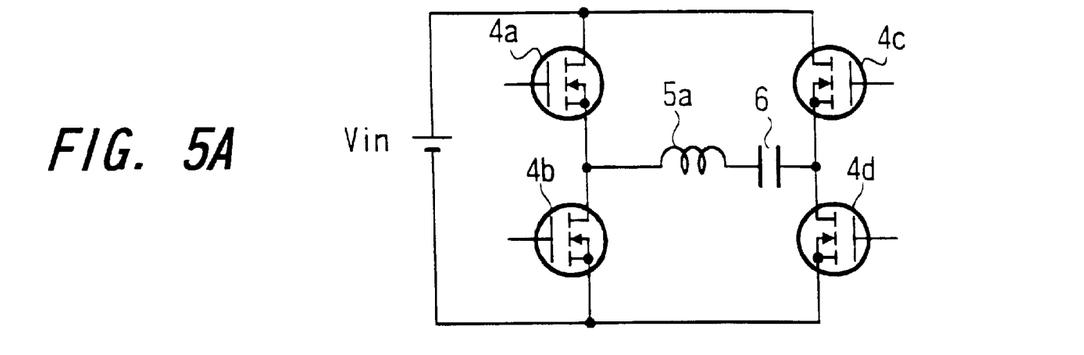
FIGS. 5A to 5C are diagrams used to explain the power source apparatus according to the present invention.
Figure 5B:
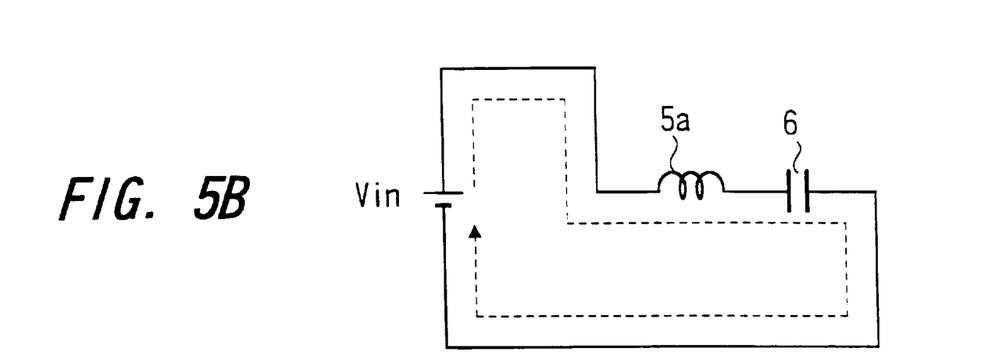
Figure 5C:
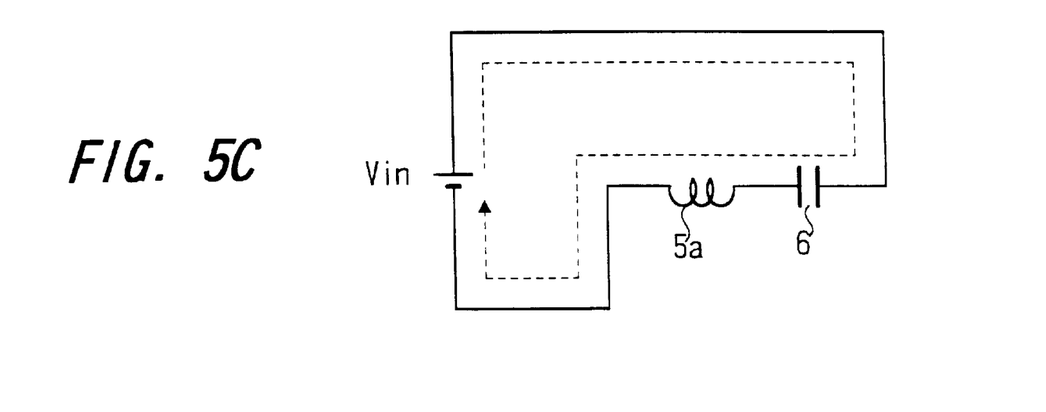

As a result, in the apparatus shown in FIG. 3, when the electric potential at the above mentioned plus side output end is lower than the predetermined value, the switching elements 4a–4d are controlled to alternately switch on and off and the apparatus is put in a full bridge action. That is, in this case, a circuit arrangement at an essential portion becomes what FIG. 5A shows, and when the switching elements 4a, 4b are switched on, a current is made to flow as shown in FIG. 5B by an arrow, while the switching elements 4b, 4c are switched on, the current is made to flow as FIG. 5C shows by an arrow.

In this case, a DC input voltage $V_{in}$ formed from the AC input voltage (not shown in the figure) is divided and applied to the winding 5a and the resonance capacitor 6. That is, assuming that a voltage applied to the winding 5a is V11 and a voltage applied to the resonance capacitor 6 is $V_c1$, the following equation (1) is established.

$$V11 + Vc1 = V_{in} \quad (1)$$

Figure 6A:
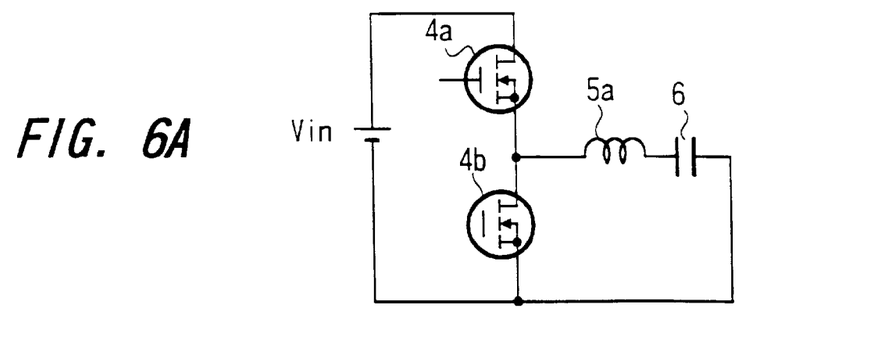
FIGS. 6A to 6C are diagrams used to explain the power source apparatus according to the present invention.
Figure 6B:
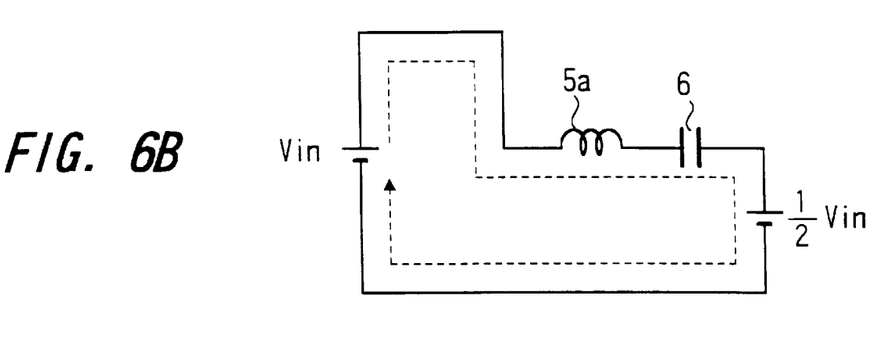
Figure 6C:
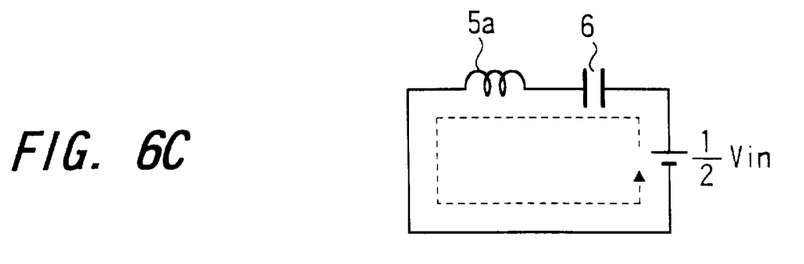

Meanwhile, then the electric potential at the above mentioned plus side output end is higher than the predetermined value, the switching element 4c is fixed to an off-state while the switching element 4d is fixed to an on-state and the apparatus is put in the half bridge action. Also, the switching elements 4a, 4b are made to alternately switch on and off and put in the single ended push-pull. Therefore, in this case, a circuit arrangement at an essential portion becomes as shown in FIG. 6A, and when the switching element 4a is turned on, a current is made to flow as shown in FIG. 6B by an arrow while the 4b is turned on, the current is made to flow as shown in FIG. 6C by an arrow.

In this case, one half voltage of the DC input voltage $V_{in}$ is formed at a position of the switching element 4d by the single ended push-pull, and on the assumption that a voltage applied to the winding 5a is V12 and a voltage applied to the resonance capacitor 6 is $V_c2$, the following equation (2) is established.

$$V12 + V_c2 = \frac{1}{2}V_{in} \quad (2)$$

That is, in this case, as it is apparent from the above mentioned equations (1), (2), when the above mentioned DC input voltages $V_{in}$ are the same, in the single ended push-pull and the half bridge action, the voltage applied to the winding 5a and the resonance capacitor 6 is ½ that at a time of the full bridge action.

To make use of the characteristic then, for example, by putting the full bridge action in place when the AC input voltage is 100 V and by changing over to the single ended push-pull and half bridge action when the AC input voltage is 200 v, a voltage applied to the primary side winding 5a of the insulation converter transformer 5 can be made equal. In this case, because a voltage taken out at the secondary side winding 5b becomes equal, a control range for stabilizing the DC output voltage relative to the AC input voltage can be substantially expanded.

Figure 7A:
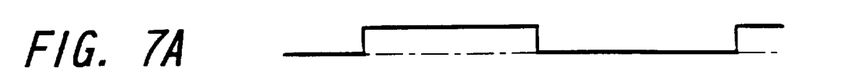
FIGS. 7A to 7M are waveform diagrams used to explain the power source apparatus according to the present invention.
Figure 7B:
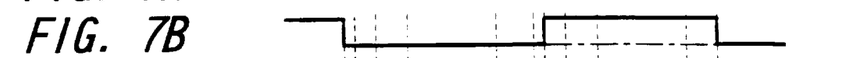
Figure 7C:
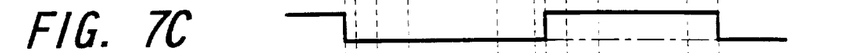
Figure 7D:
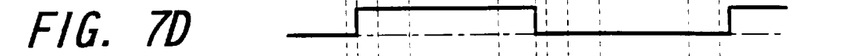
Figure 7E:
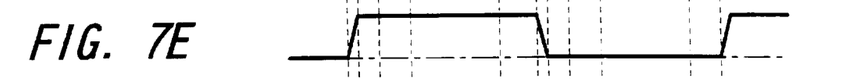
Figure 7F:
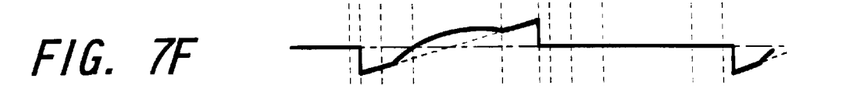
Figure 7G:
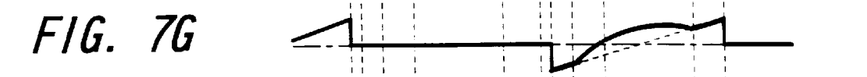
Figure 7H:
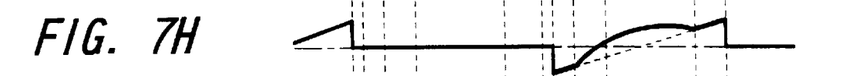
Figure 7I:
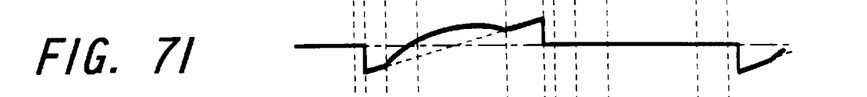

That is, in this apparatus, in the full bridge action during a no-load (a dotted line) to a light load, waveforms at respective sections become as shown in FIGS. 7A to 7M. Here, the switching elements 4a to 4d are supplied respectively with, for example, the drive pulse signals as shown by FIGS. 7A to 7D, and the switching thereof is conducted. In this case, for example, between a drain and a source of the switching element 4d, a voltage is formed as shown in FIG. 7E.

Figure 7J:
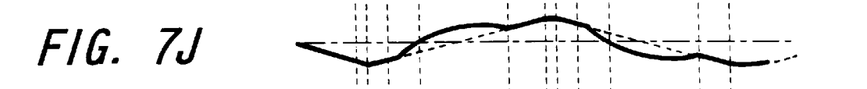
Figure 7K:
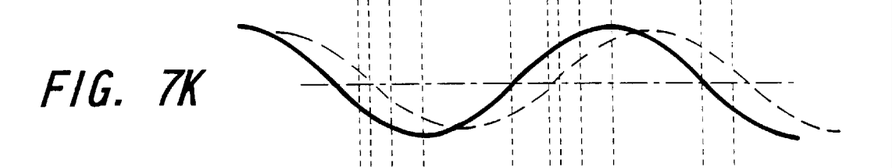
Figure 7L:
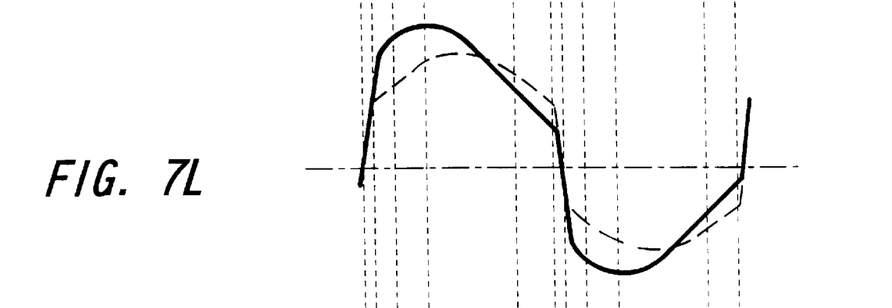
Figure 7M:
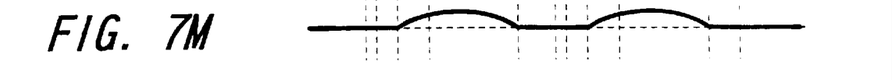

Further, between the drain and the source of the switching element 4a–4d, currents shown, for example, in FIGS. 7F to 7I are respectively made to flow. As a result, a current as shown in FIG. 7J is made to flow through the primary side winding 5a and a voltage shown in FIG. 7K is formed across the resonance capacitor 6. Then, across the primary side winding 5a is generated a voltage shown in FIG. 7L and a current shown in FIG. 7M is made to flow through the secondary side winding 5b.

Figure 8A:
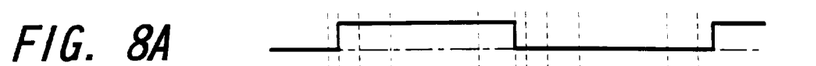
FIGS. 8A to 8M are waveform diagrams used to explain the power source apparatus according to the present invention.
Figure 8B:
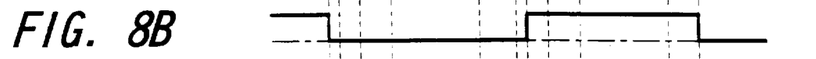
Figure 8C:
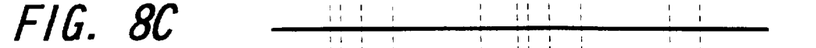
Figure 8D:
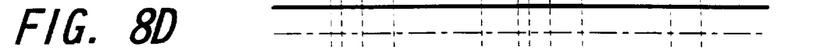
Figure 8E:
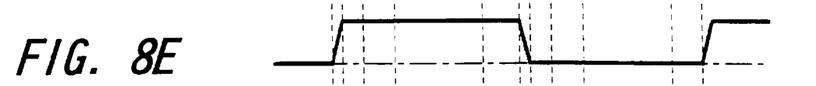
Figure 8F:
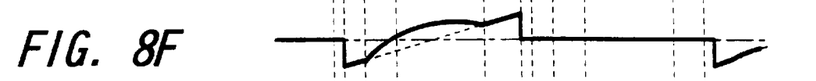
Figure 8G:
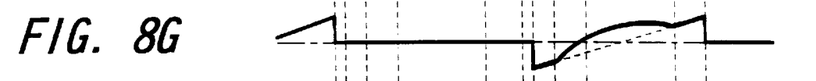
Figure 8H:
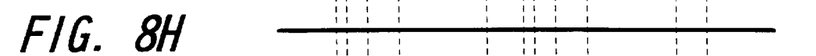
Figure 8I:
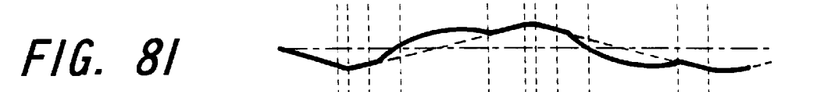

Meanwhile, in the single ended push-pull and half bridge action at the times of the no-load (a dotted line) to the light load, waveforms at the respective parts become as shown in FIGS. 8A to 8M. Here, drive pulse signals as shown in FIGS. 8A to 8D are supplied respectively to the switching elements 4a–4d and the switchings thereof are conducted. And in this case, for example, between the drain and the source of the switching element 4d, a voltage is formed shown in FIG. 8E.

Figure 8J:
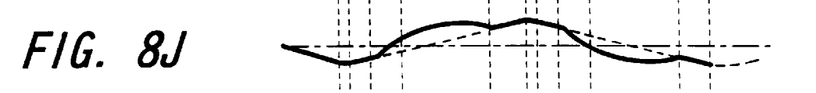
Figure 8K:
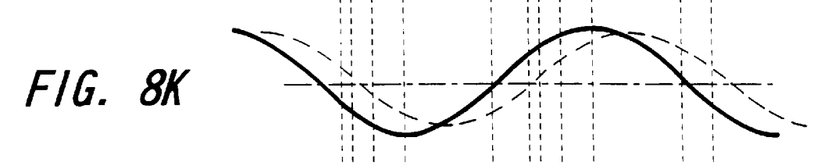
Figure 8L:
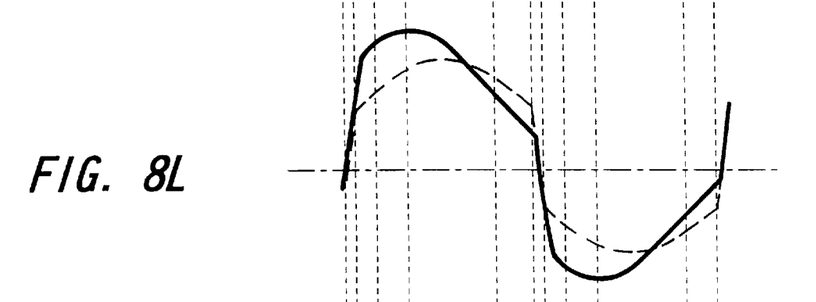
Figure 8M:
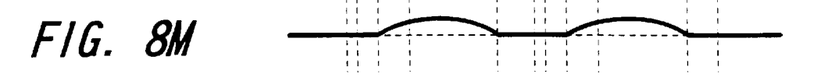

Further, between the drain and the source of the switching elements 4a–4d, currents shown in FIGS. 8F to 8I are made to flow, respectively. As a result, a current shown in FIG. 8J is made to flow through the primary side winding 5a and at the resonance capacitor 6, a voltage shown in FIG. 8K is generated. Then, across the primary side winding 5a, a voltage shown in FIG. 8L is generated and a current shown in FIG. 8M is made to flow through the secondary side winding 5b.

The waveforms of the currents flowing through the primary side winding 5a as shown in FIGS. 7J and 8J and the following waveforms become entirely equal. Therefore, by changing over to the single ended push-pull and half bridge action, for example, when the AC input voltage becomes twofold, voltages applied to the primary side winding 5a of the insulating converter transformer 5 are made equal and a control range for stabilizing the DC output voltage relative to the AC input voltage can be substantially expanded.

Therefore, in this apparatus, by changing over the supplying path of the exciting current to two modes or between the full bridge action and the single ended push-pull or half bridge action, a constantly efficient conversion can be conducted with a simple arrangement and at the same time, a fear of an output voltage of extremely high voltage being taken out due to an abnormality can be prevented.

That is, according to the present invention a power source apparatus can be constituted by one AC-DC converter relative to the two fold change in the AC input voltage, which makes its arrangement simple and at the same time, an arrangement of the AC-DC converter simple as well as enhances its conversion efficiency by making equal a voltage applied to the AC-DC converter as against the two fold change of the AC input voltage.

Also, according to the present invention, because the double voltage rectification which has been used by the conventional apparatus is not conducted, there are no fear of an output voltage of extremely high voltage being taken out due to an abnormality and accordingly, and no need to provide a safety device and the like deemed necessary by the conventional apparatus. Further, constantly efficient conversion can be conducted with a simple arrangement.

Further, in the above mentioned apparatus, on the assumption that resistance values of the resistors 21a, 21b, 22, 23 are respectively taken as R1, R2, R3, R4, a voltage Vb1 at a change-over point when the full bridge action is changed over to the single ended push-pull and half bridge action, becomes as follows.

$$Vb1 = \frac{R2 \cdot Vcc}{\frac{R1 \cdot R3 \cdot R4}{R1 + R3 + R4} + R2} \quad (3)$$

Also, a voltage Vb2 at a point of a change-over from the single ended push-pull and half bridge action to the full bridge action is as follows.

$$Vb2 = \frac{R2 \cdot R3 \cdot Vcc}{R2 \cdot R3 + (R2 + R3) \cdot R1} \quad (4)$$

Then, in the above mentioned apparatus the resistance values R1, R2, R3, R4 of the resistors 21a, 22b, 22, 23 are respectively decided so that voltages at the change-over point become Vb1>Vb2, which makes the above mentioned change-over action possess a hysteresis. Thus, it is possible by this hysteresis that a mutual change-over does not occur frequently and actions of the apparatus can be stabilized.

Also, in the above mentioned apparatus, when the output of the comparator 24 is a high electric potential and an input to the drive circuit 17d is biased to a high electric potential (at a right side in FIGS. 4A to 4J), a bottom value of an input to the drive circuit 17d (shown in FIG. 4F) is decided by resistance values of the resistors 18b and 26. Therefore, the resistors values of the above mentioned resistances 18b and 26 are decided so that this bottom value is judged to be a high electric potential at the drive circuit 17d.

Figure 9:
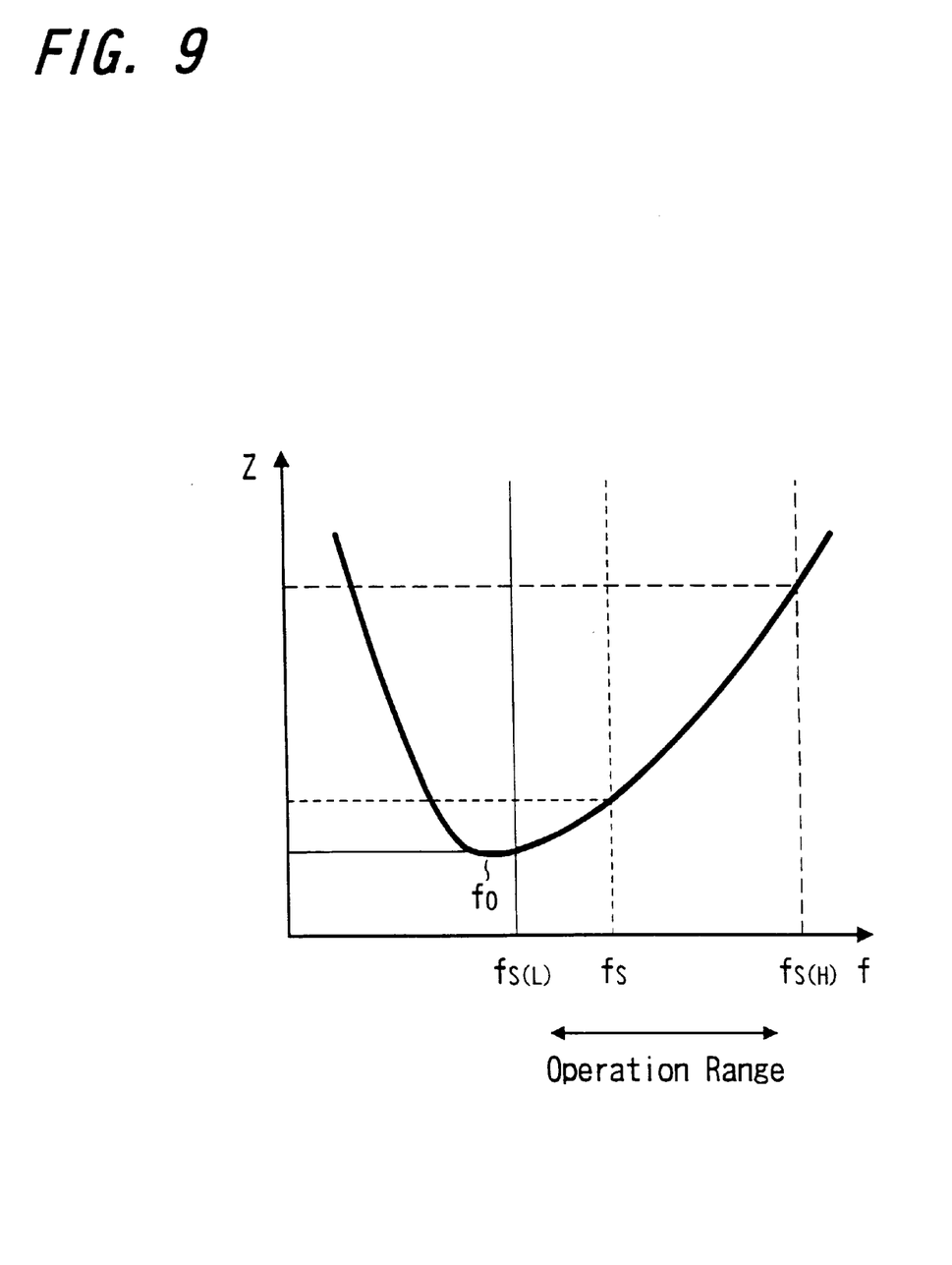
FIG. 9 is a characteristic diagram used to explain the power source apparatus according to the present invention.

Further, in the above mentioned apparatus, a primary resonance impedance curve of the insulation converter transformer 5 becomes what is shown in FIG. 9. In FIG. 9, a value f0 is a primary side resonance frequency of the insulation converter transformer 5. If it is assumed that an inductance of the primary side winding 5a is L1 and a capacitance of the resonance capacitor 6 is C1, the following equation (5) is established.

$$f0 = \frac{1}{2}\pi\sqrt{(L1, C1)} \quad (5)$$

Also, in FIG. 9, a value $f_s$ is an oscillating frequency of the oscillating control circuit 16 and a value $f_s(L)$ indicates a minimum oscillating frequency while a value fs(H) indicates a maximum oscillating frequency.

And in FIG. 9, controls in a case of using an upper side of the above mentioned resonance impedance curve are as follows.

That is, when the voltage from the voltage dividing point of the voltage dividing circuit 10 becomes higher than the reference voltage from the reference voltage source 12, this fact is detected by the error amplifier 11, so that the current flowing through the resistor 15 by way of the photo-coupler 14 is increased. As a result, such a control is carried out that the oscillating frequency $f_s$ of the drive pulse from the oscillating control circuit 16 is made high and the oscillating frequencies of the drive circuit 17a–17d become high so that the primary side resonance impedance of the insulating converter transformer 5 becomes larger, which makes the exciting current flowing through the primary side winding 5a smaller, and the DC output voltage lower.

Meanwhile, when the voltage from the voltage dividing point of the voltage dividing circuit 10 becomes lower than the reference voltage from the reference voltage source 12, this fact is detected by the error amplifier 11 and the current flowing through the resistor 15 by way of the photo-coupler 14 is decreased. As a result, the oscillating frequency $f_s$ of the drive pulse of the oscillating control circuit 16 is lowered and the oscillating frequencies of the drive circuits 17a–17d are lowered so that the primary side resonance impedance of the insulating converter transformer 5 becomes smaller. Thus, such a control is carried out that the exciting current flowing through the primary side winding 5a is made larger, and the DC output voltage becomes higher.

In this manner, the DC output voltage applied to the load 9 is detected at the secondary side of the insulating converter transformer 5 and this detected signal is supplied to the control terminal of the oscillating control circuit 16 through the photo-coupler 14. The drive pulse signals formed by the oscillating control circuit 16 according to the detected signal are supplied to the switching elements 4a–4d to control each switching thereof. As a result, the electric potential at the voltage dividing point of the voltage dividing circuit 10 is so controlled as to be equal to the electric potential of the reference voltage source 12.

Further, in the power source apparatus in FIG. 3 mentioned above, at a time of mutually changing over two modes of the full bridge action and the single ended push-pull and half bridge action, by suppressing the current flowing through each of the switching elements 4a–4d, controls for stabilizing the change-over can be carried out.

That is, in FIG. 3, the output of the comparator 20 is connected to one end of a resistor 29 through a diode 28 of a backward direction, and the other end of the resistor 29 is connected to a base of a transistor 31 through a capacitor 30. Also, the power source terminal of the voltage Vcc is connected to a connecting middle point between the resistor 29 and the capacitor 30 through a resistor 32. Further, an emitter of the transistor 31 is grounded, and between the base of the transistor 31 and the ground a parallel circuit of a diode 33 of a backward direction and a resistor 34 is provided. Also, a collector of the transistor 31 is connected to the oscillating control circuit 16 through the resistor 15.

Therefore, in this circuit when there is a change-over from the single ended push-pull or half bridge action to the full bridge action, the output of the comparator 20 is changed over from a low electric potential to a high electric potential. As a result, the diode 28 is cut off and while the capacitor 30 is charged through the resistor 32 and the capacitor 30, a current is supplied to the base of the transistor 31 from the power source terminal of the voltage $V_{cc}$, which makes the transistor 31 turned on and the oscillating frequency of the oscillating control circuit 16 becomes higher during this period.

When the full bridge action returns to the single ended push-pull or half bridge action, because the output of the comparator 20 changes over from the high electric potential to the low electric potential, an electric charge in the capacitor 30 is discharged through the diode 28 and the resistor 29. As a result, at the moment whenever there is a change-over to the full bridge action, the transistor 31 can be tuned on.

When the transistor 31 is turned on and the oscillating frequency of the oscillating frequency circuit 16 in this period becomes higher, the primary side resonance impedance of the insulating converter transformer 5 becomes larger and the current flowing through each of the switching elements 4a to 4d can be suppressed.

Besides, the fact that the oscillating frequency of the oscillating control circuit 16 is made higher means that the primary side resonance impedance of the insulating converter transformer 5 becomes larger. Therefore, if that state continues long, there arises a fear of an output voltage between both ends of the load 9 at the secondary side being dropped. Therefore, in the above mentioned circuit, by setting up a time constant of the resistor 32 and the capacitor 30 suitably, an adjustment is made so that this time period stays within a range of not lowering the output voltage.

In this manner, according to the above mentioned apparatus, in a power source apparatus in which an exciting current of the primary side winding of the insulating converter transformer is switched by the switching element, and by controlling an oscillation state of the oscillating drive circuit connected to the switching element according to the secondary side output of the insulating converter transformer, the secondary side output voltage is controlled to be a constant voltage, by controls of the oscillating drive circuit, the supplying path of the exciting current is changed over between two modes such as the full bridge action and the single ended push-pull and half bridge action, which makes it possible to conduct a constantly efficient conversion with a simple arrangement and at the same time, eliminate a fear of an output voltage of extremely high voltage being taken out due to an abnormality.

Besides, in the above mentioned apparatus, detection of signals for changing over between the two modes such as the full bridge action and the single ended push-pull or half bridge action can be conducted not only by detecting the rectified voltage of the above mentioned AC input voltage and the AC input voltage itself as well but by detecting the current which flows through the above mentioned switching element or the above mentioned insulating converter transformer.

Also, at a time the above mentioned oscillating drive circuit is changed over from the single ended push-pull or half bridge action to the full bridge action, controls for suppressing the electric current flowing through the switching element are not limited to a method of suppressing the current by increasing the switching frequency of the above mentioned switching element but other method is also recommended in which the current which flows through the above mentioned switching element or the primary side winding of the insulating converter transformer is detected and then the current is suppressed.

According to the present invention, by changing over the supplying path of the exciting current between the two modes of the full bridge action and the single ended push-pull or half bridge action, it becomes possible to conduct a constantly efficient conversion with a simple arrangement and eliminate a fear of the output voltage of extremely high voltage being taken out due to an abnormality.

That is, in the present invention it is possible to form the power source apparatus by one AC-DC converter for the twofold change in the AC input voltage, by which its arrangement can be simplified and at the same time, by making a voltage applied to the AC-DC converter equal relative to twofold change in the AC input voltage, a arrangement of the AC-DC converter can be simplified and its conversion efficiency can be improved.

Also, in the present invention, because the double-voltage rectification used by a conventional apparatus is not conducted, there is no fear, for example, of the output voltage of extremely high tension being taken out due to, for example, an abnormality and therefore, there is no need for providing a safety device and the like deemed necessary for a conventional apparatus. Further, constantly efficient conversion can be conducted by a simple arrangement.

In addition, it is possible to let the above mentioned change-over action possess hysteresis, and it is possible by this hysteresis that the mutual change-over does not occur frequently and actions of the apparatus are stabilized.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A power supply apparatus receiving one of a plurality of different AC voltages and producing a constant DC voltage regardless of which one of said plurality of different AC voltages is received, wherein an exciting current of a primary winding of a sole insulating converter transformer is switched by a switching circuit, and an oscillation state of an oscillating drive circuit connected to said switching circuit is controlled according to a secondary side output voltage of said sole insulating converter transformer for controlling said secondary side output voltage to result in said constant DC voltage, said power supply apparatus comprising:

changing means under control of said oscillating drive circuit for providing a changing voltage to said switching circuit for changing over a supplying path of said exciting current between one of two modes of a full bridge action and a single ended push-pull or half bridge action, wherein the changing voltage fed to said switching circuit possesses hysteresis.

2. The power supply apparatus according to claim 1, further comprising:

a diode bridge for rectifying said plurality of different input AC voltages, and wherein said switching circuit includes two pairs of series circuits formed with four switching elements, each of said pairs connected in series between a plus side output end and a minus side output end of said diode bridge, and said primary winding of said sole insulating converter transformer having a capacitor in series therewith is connected between middle points of said two pairs of switching elements, and wherein said changing over said supplying path is performed between a first mode in which said four switching elements are driven in a full bridge action, and a second mode in which one pair of said series circuits is driven by a push-pull action and the other pair is driven by a single ended push-pull or half bridge action having one switching element thereof in an off-state and the other switching element thereof in an on-state.

3. The power supply apparatus according to claim 2, further comprising detecting means for detecting a signal of one of a rectified AC voltage produced by said diode bridge, a first current flowing through said switching circuit, and a second current flowing through said sole insulating converter transformer, and for controlling said oscillating drive circuit using said signal detected by said detecting means for changing over said supplying path.

4. The power supply apparatus according to claim 3, wherein when changing over said supplying path a switching frequency of said oscillating drive circuit is increased for suppressing a current flowing through said switching circuit.

5. The power supply apparatus according to claim 3, wherein when changing over said supplying path a current flowing through one of said switching elements and said primary winding of said sole insulating converter transformer is detected and suppressed by said detecting means.

6. The power supply apparatus according to claim 4, wherein when increasing said switching frequency for suppressing said current flowing through said switching circuit a period of said switching frequency is controlled so that said secondary side output voltage of said sole insulating transformer is not reduced.

* * * * *